United States Patent Office 3,847,872
Patented Nov. 12, 1974

3,847,872
WATER WHITE POLYIMIDE POLYMER PREPARED FROM DI(AMINOMETHYL)-DI-ALKYLADAMANTANES
Robert M. Thompson, Wilmington, Del., assignor to Sun Ventures, Inc., St. Davids, Pa.
No Drawing. Continuation-in-part of application Ser. No. 191,700, Oct. 22, 1971. This application May 10, 1973, Ser. No. 359,173
Int. Cl. C08g 20/32
U.S. Cl. 260—65
14 Claims

ABSTRACT OF THE DISCLOSURE

Novel, solid water white polyimide is disclosed. Polymer is prepared by condensation of certain di(aminomethyl-dialkyladamantanes, e.g., 1,3 - di(aminomethyl)-5,7-dialkyladamantane and certain polyanhydrides, e.g., dianhydride of 1,2,4,5-benzene-tetracarboxylic acid. Polymer can be shaped into useful, thermally stable forms, e.g., film or sheets, which are free of the usual yellow tint of other polyimide polymers.

CROSS REFERENCE TO RELATED APPLICATIONS

This application is a continuation-in-part of application Ser. No. 191,700, filed Oct. 22, 1971 now abandoned, which in turn is related to those described and claimed in applicant's applications Ser. Nos. 191,826, now U.S. Pat. 3,748,359, 191,927 now U.S. Pat. 3,792,371, 191,833 now allowed and 191,706, abandoned Nov. 20, 1972 all filed the same date as the latter application. The first of the aforementioned related applications pertains to the preparation of a dialkyladamantane diamine from a dialkyladamantane diacid; the second to the preparation of a dialkyladamantane dinitrile from a dialkyladamantane diacid; and third to a polyamide prepared from a dialkyladamantane diamine and the fourth to a novel polyimide polymer prepared from a dialkyladamantane diamine.

BACKGROUND OF THE INVENTION

This invention relates to a solid, water white polimide having the following recurring unit:

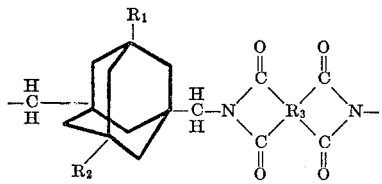

wherein $R_1$ and $R_2$ each are alkyls containing one to ten carbons and $R_3$ is selected from the group consisting of

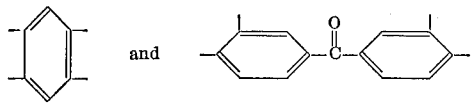

The invention also relates to the method of preparing the aforementioned polyimide. The method involves a chemical reaction which is generally known as a condensation reaction and the resulting polymer is generally known as a condensation polymer. Generally, a condensation polymer is one derived from two monomeric starting materials and is formed by the elimination of water or the equivalent. Thus as used herein, the term condensation polymer refers to the diamine (A) and the dianhydride (B) condensing to form the novel polyimide having the repeating unit —AB—.

The prior art discloses 1,3-diamino-adamantane and 3,3'-di(aminomethyl)-1,1'-diadamantane, see U.S. Pat. No. 3,419,611, R. E. Moore, December 1968; U.S. Pat. No. 3,565,549, H. R. Lubowitz et al., Feb. 23, 1971; and U.S. Pat. No. 3,342,774, E. F. Hoegger, Sept. 19, 1967. This prior art suggests that the aforementioned adamantanes are suitable for use in the preparation of certain polyimides and/or polyamides.

Surprisingly, it has been found that novel polymers prepared from certain di(aminomethyl)dialkyladamantanes have a higher molecular weight than other diaminoadamantanes. For example, polyimide polymer prepared from 1,3-di(aminomethyl)-5,7-dimethyladamantane has a much higher molecular weight, as indicated by inherent viscosity, than the disclosed 1,3-diaminoadamantane. Thus, U.S. Pat. No. 3,301,827, E. L. Martin, Jan. 31, 1967, discloses that a melt-spinnable polymer resulting from the condensation of 1,3-diaminoadamantane and sebacic acid has an inherent viscosity (m-cresol at 25° C.) of 0.33. By comparison, a melt-spinnable polymer resulting from the condensation of 1,3-di(aminomethyl)-5,7-dimethyladamantane and sebacic acid has an unexpected inherent viscosity (m-cresol at 25° C.) of 0.60. Both polymers were prepared in the same manner. The higher inherent viscosity of the latter polymer indicates a substantially higher molecular weight which in turn can indicate superior physical properties.

Applicant postulates two reasons for this substantial difference in inherent viscosity. When the 1,3-diaminoadamantane is undergoing condensation with another reactant, the overall reaction rate will be substantially slower than the rate wherein the reactant is one of present invention, for example, 1,3-di(aminomethyl)-5,7-dimethyladamantane. This slower reaction rate is caused by stearic hindrance of the

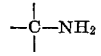

radical of the 1,3-diaminoadamantane whereas the

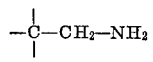

radical of the 1,3-di(aminomethyl)-5,7-dialkyladamantane is not so handicapped. The consequence of the slower reaction rate is a lower molecular weight for the desired polymer and a greater amount of undesirable side products on the desired polymer. The ultimate consequence is a solid polymer with less than the ultimate physical performance possible if higher molecular weights were obtained in conjunction with the lack of side products.

Also, in addition, condensation polymers prepared from the disclosed 1,3-diaminoadamantane or the 3,3'-di-(aminomethyl)-1,1'-diadamantane suffers another disadvantage. The hydrogens attached to carbons at the 5,7 position of the admantane tend to be relatively highly reactive and thus during the polymer preparation the carbons at the 5,7 position become sites of other reactions. Consequently, the resulting polymer prepared from either the 1,3-diaminoadamantane or the 3,3'-di(aminomethyl)-1,1'-diadamantane can be physically inferior to similar polymers prepared from the alkyladamantanes of present invention. Furthermore, even if the carbons and the 5,7 position are not involved in other reactions, the carbons and their relatively active hydrogens are weak points within the final polymer. Thus, when the polymer is exposed to an elevated temperature, the carbons become points where thermal breakdown can start. By comparison, no such weak sites are available in present polymer because the two active hydrogens have been displaced by two alkyls. Thus, present polymer can withstand higher temperature than similar polymers suggested by the prior art.

SUMMARY OF THE INVENTION

This invention relates to a solid polyimide and the method of preparing it. The solid polyimide polymer is water white and highly thermally stable. Its structure is described in the Background of the Invention portion of this specification. The invention also relates to a method of preparing a condensation polymer having highly desirable properties from a certain dialkyladamantane diamine and a certain polyanhydride. The polyanhydride is the dianhydride of 1,2,4,5 - benzene - tetracarboxylic acid or 3,4,3',4' - benzophenonetetracarboxylic dianhydride. The method comprises contacting essentially equal mole amounts of the particular dialkyladamantane diamine and either dianhydride in the presence of a suitable polar organic solvent and maintaining contacting materials at a temperature of about 0° C.–30° C. until desired viscosity is obtained and subsequently removing the solvent. After substantially all the solvent is removed at a noncondensation temperature, the resulting polyimic acid is heated to a condensation temperature until the condensation is completed. Surprisingly, the polymer itself and the article prepared from the polyimide polymer are free of the usual color of a thermally stable polyimide polymer. Thus, for example, a resulting film is water white. Also, present invention relates to water white film or sheet prepared from the polyimide polymer.

DESCRIPTION OF THE INVENTION

The dialkyladamantane diamine referred to herein has the following structure:

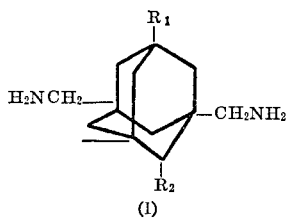

(I)

where each of $R_1$ and $R_2$ is an alkyl radical having 1–10 carbon atoms. Preferred diamines are those where $R_1$ and $R_2$ each is a methyl and/or ethyl radical.

The other reactant is one of the following: dianhydride of 1,2,4,5-benzenetetracarboxylic acid, and 3,4,3',4'-benzophenonetetracarboxylic dianhydride. These two polyanhydrides, for convenience, are referred to herein as PMDA (II) and 3,4DA (III), respectively. The structures representing these two polyanhydrides are as follows:

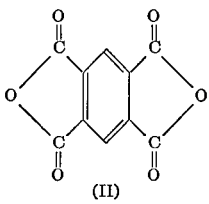

(II)

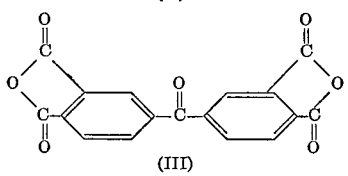

(III)

Typically, the dianhydride and the diamine are dissolved in a suitable polar organic solvent. Normally, the diamine would be dissolved first, and afterwards, the dianhydride is added to the resulting mixture in portions. That is to say, for example, 100 parts of dianhydride might be added 10 parts at a time; the total timing requiring, say, 10 minutes. The aforementioned normal technique is preferable; however, other variations are operable.

The amounts of diamine and dianhydride, for example, the dianhydride of 1,2,4,5-benzene tetracarboxylic acid used should be sufficient to form the following compounds:

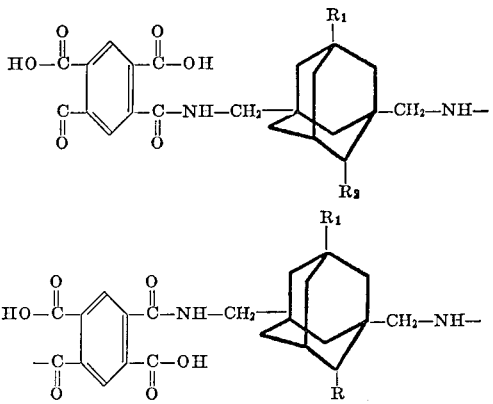

Thus, essentially equal mole amounts of dianhydride and diamine are contacted; however, excesses are still operable; preferably not greater than 5 mole percent excess of either component and even more preferably, not greater than 2%.

Some examples of "suitable polar organic solvents" are N,N-dimethylacetamide, N,N-dimethylformamide, and N-methyl-2-pyrrolidinone. The term "suitable polar organic solvent" excludes a polar organic solvent containing an —OH radical. Examples of the latter are alcohol and acid. Also, the solvent is one which does not react with either the reactants or resulting product.

The temperature at which the dianhydride and diamine are dissolved in the suitable solvent and afterwards maintained while the reaction is proceeding can be 0° C.–30° C. A temperature range of about 10° C.–20° C. is preferred. Normally, while the reaction is proceeding, the mixture is under agitation. The mixture is maintained at said temperature and agitated until the desired viscosity is obtained.

After the mixture containing the diamine, dianhydride, reaction product and the solvent reaches the desired viscosity, several alternatives exist. Additional solvent can be added to the mixture to reduce the viscosity thereby facilitating ease of handling. Alternatively, the mixture can be formed into a wanted shape and then the solvent removed. Finally, the solvent can be removed and the resulting polyimic acid can be converted into a high molecular weight polymer.

The polyimic acids of the present invention preferably have inherent viscosities in the range of .05–5.0. The inherent viscosity ($\eta_{inh}$) is indicative of the degree of polymerization and is used herein as a measure hereof. Inherent viscosity is represented by the equation:

$$\eta_{inherent} = \ln \frac{\eta_{relative}}{C}$$

where $\eta$ relative $= t/t_o$ $t_o$ = flow time through a viscometer of a liquid reference $t$ = flow time through the same viscometer of a dilute solution of polymer in the reference liquid $C$ = concentration of polymer in solution expressed in grams/deciliter.

Inherent viscosities ($\eta_{inh}$) unless otherwise specified is determined in the instant specification and claims by a 0.5% solution of polymer in N,N-dimethylacetamide and are measured at 37.8° C.

Shaping the aforementioned mixture, i.e., the polyimic acid and solvent, can be accomplished by numerous methods. A few examples are extrusion, casting and injection molding.

The solvent can be removed from the mixture by many well known methods. Among these methods are heating at a non-condensation temperature, preferably below 150° F., and even more preferably below 125° F., and heating at a non-condensation temperature under vacuum.

After substantially all the solvent has been removed, the remaining material, i.e., the polyimic acid, is heated to a condensation temperature and maintained at that temperature until the reaction is complete. Normally this temperature is about 150°–500° C., preferably, 200° C.–400° C. During condensation, water is formed and because of the elevated temperature, evaporates.

Not only is the resulting polyimide polymer extremely insensitive to heat compared to a polyimide polymer prepared from a paraffinic diamine, but contrary to a polyimide prepared by other methods, it is free of the usual yellowish tint of a thermally stable polyimide polymer. Thus, the polyimide polymer of this invention is water white. This latter characteristic is extremely valuable for articles requiring eye appeal; particularly for sheets or films used to package consumer goods. Film is an optional term for sheeting having a nominal thickness not greater than 10 mils. Sheet is a flat section of polymer with the length considerably greater than the width and 10 mils or greater in thickness.

In order to further illustrate the invention, the following example is given.

EXAMPLE

A measured quantity of 1,3-di(aminomethyl)-5,7-dimethyladamantane was dissolved in 15 milliliters of N,N-dimethylacetamide contained in a 100 milliliter L neck flask. The flask contained a magnetic stirring bar. The quantity of diamine added was 2.24 grams or 0.0101 gram moles. The said acetamide had been dried by storage over molecular sieves. The contents of the flask were protected from atmospheric moisture by a drying tube filled with an indicating dryer and attached to the L neck of the flask.

To the diamine and the acetamide in the flask was added 2.20 grams of 0.010 gram moles of PMDA. The PMDA had been purified by its recrystallization. This latter step was not absolutely necessary but rather taken as a precautionary step. The PMDA was added in a stepwise fashion; i.e., small portions of the 2.2 grams were added to the flask over a period of about 10 minutes.

The contents of the flask were maintained, with continuous stirring, at 15° C. for about two hours. During these two hours, the viscosity of the mixture increased substantially. Afterwards, 5 more milliliters of the acetamide were added to the flask to reduce the viscosity of the mixture. The polyimic acid had an inherent viscosity of 0.3 indicating a relatively low molecular weight.

The diluted mixture was spread on a glass plate with a doctor knife. The covered glass plate was placed in a vacuum oven maintained at 50° C. to evaporate the solvent. This temperature was below the condensation temperature of the resulting acid. After the solvent evaporated, the covered plate was heated to and maintained at 200° C. for 30 minutes. The purpose of this latter heating, while causing any residual solvent to evaporate, was to bring about a condensation reaction.

Upon cooling, the resulting film was removed from the glass plate. This film was water white. The film was somewhat brittle because of a low molecular weight. In some applications, this lower molecular weight can be desirable. Higher molecular weights can be obtained by adjusting the reaction time for the formation of the polyimic acid. Also, increasing the time over which the dianhydride is added to the reaction mixture of diamine and acetamide can modify the molecular weight.

The use of other dialkyladamantane diamines, such as 1,3-di-(aminomethyl)-5-methyl, 7-ethyl adamantane; 1,3-di(aminomethyl)-5-ethyl,7-propyl adamantane, etc., also will yield analogous polymers. The use of 3,4,3',4'-benzophenonetetracarboxylic dianhydride also will yield similar polymers.

The invention claimed is:

1. Method for the preparation of a solid polyimide polymer comprising:
   (a) contacting essentially equal mole amounts of a dianhydride selected from the group consisting of dianhydride of 1,2,4,5-benzene-tetracarboxylic acid and 3,4,3',4' - benzophenonetetracarboxylic dianhydride and a dialkyladamantane diamine of the following structure:

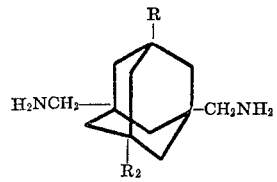

where each of $R_1$ and $R_2$ is alkyl radical having 1–10 carbon atoms in the presence of a suitable polar organic solvent at a temperature of 0° C.–30° C., and maintaining said contacting until the desired viscosity is obtained; afterwards,
   (b) removing said solvent at a temperature below the condensation temperature of the resulting polyimic acid; and after removal,
   (c) heating the polyimic acid to a temperature of about 150° C.–500° C. until condensation is completed; whereby resulting solid polyimide is clear and water white.

2. Method according to Claim 1 wherein the suitable polar organic solvent is one of the following: N,N-dimethylacetamide, N,N-dimethylformamide, N - methyl-2-pyrrolidinone.

3. Method according to Claim 2 wherein the contacting temperature of step 1(a) is 10° C.–20° C.

4. Method according to Claim 3 wherein the condensation temperature of step 1(c) is 200° C.–400° C.

5. Method according to Claim 4 wherein the dianhydride is the dianhydride of 1,2,4,5-benzene-tetracarboxylic acid.

6. Method according to Claim 5 wherein $R_1$ and $R_2$ are methyl groups.

7. A solid, water white polyimide having the following recurring unit:

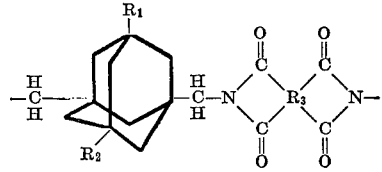

wherein there are about 10 to 200 repeating units and wherein $R_1$ and $R_2$ each are alkyls containing one to ten carbons and $R_3$ is selected from the group consisting of

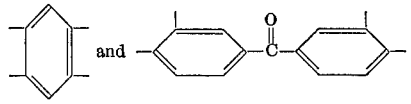

8. A polyimide according to Claim 7 wherein $R_1$ and $R_2$ are methyl.

9. A polyimide according to Claim 8 wherein there are about 15 to 150 repeating units.

10. A polyimide according to Claim 9 wherein $R_3$ is the shown tetravalent benzene ring.

11. A water white sheet consisting essentially of the polyimide of Claim 7.

12. A water white film consisting essentially of the polyimide of Claim 7.

13. A water white sheet consisting essentially of the polyimide of Claim 9.

14. A water white film consisting essentially of the polyimide of Claim 9.

(References on following page)

References Cited

UNITED STATES PATENTS

| | | | |
|---|---|---|---|
| 3,179,614 | 4/1965 | Edwards | 260—78 TFX |
| 3,179,634 | 4/1965 | Edwards | 260—78 TF |
| 3,342,774 | 9/1967 | Hoegger | 260—78 TFX |
| 3,419,611 | 12/1968 | Moore | 260—563 |
| 3,565,549 | 2/1971 | Lubowitz | 260—78 TFX |
| 3,356,719 | 12/1967 | Schneider et al. | 260—514 |

OTHER REFERENCES

Chem. Abstracts, Vol. 71, 2762S.

HOWARD E. SCHAIN, Primary Examiner

U.S. Cl. X.R.

260—30.4 N, 32.6 N, 78 TF